Figure 1:
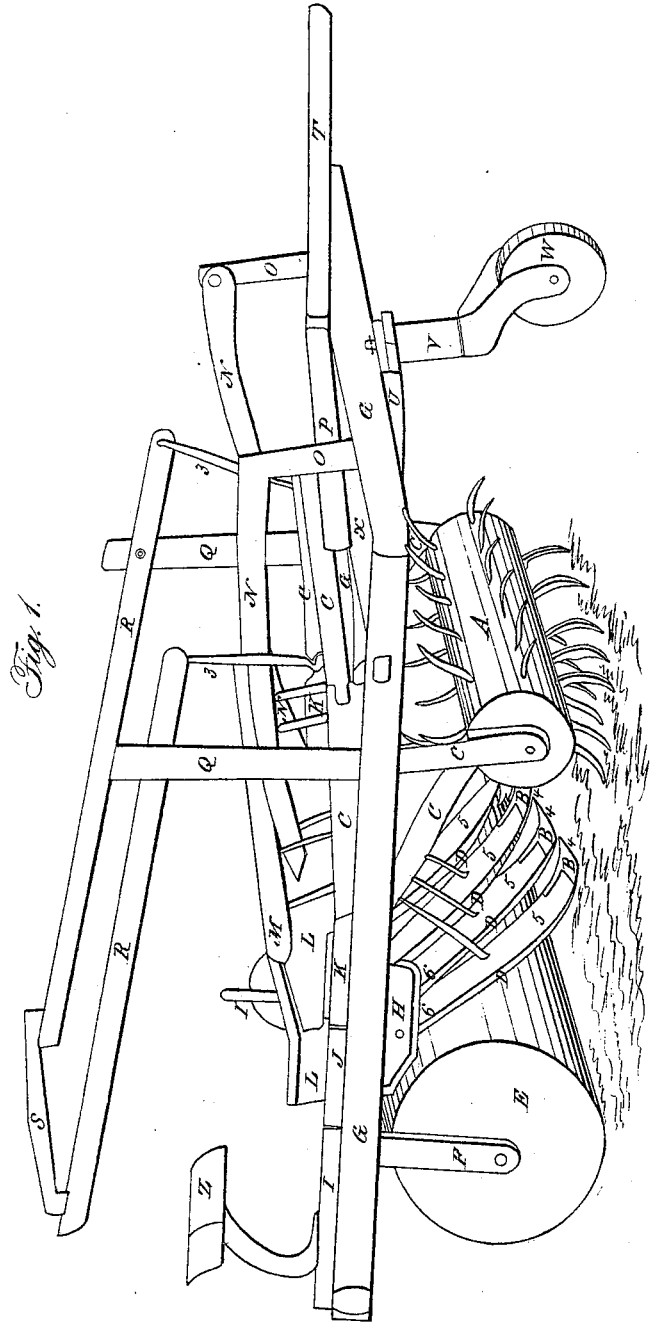

J. TEDFORD.
Grain Drill.

No. 52,225. Patented Jan. 23, 1866.

Witnesses:
Clark Baisley
W. C. Shepherd

Inventor:
Joseph Tedford

UNITED STATES PATENT OFFICE.

JOSEPH TEDFORD, OF HARTFORD, IOWA.

IMPROVEMENT IN COMBINED SEED-DRILL.

Specification forming part of Letters Patent No. 52,225, dated January 23, 1866.

*To all whom it may concern:*

Be it known that I, JOSEPH TEDFORD, of the town of Hartford, in the county of Warren and State of Iowa, have invented a new and useful machine for drilling or planting wheat or other small seeds, it being a combined rotary digger, seed-drill, and roller; and I do hereby declare that the following is a full, clear, and exact description of the construction and operation of the same, reference being had to the annexed drawings, making a part of this specification, in which the figure is a perspective view.

The rotary digger is marked A. The supporting-frame of rotary digger is marked C; the main lever to the rotary digger, R. The handle to the rotary-digger lever is marked S. The iron hooks that attach the main frame of the rotary digger to the rotary-digger lever are marked 3. The hopper in which the grain is put is marked L L. The india-rubber tubes, that extend from hopper to drill-tube, are marked 6. The sheet-iron drill-tube, that extends from india-rubber to the ground, is marked D. The foot of drill is marked 5. The plowshare at the bottom of drill is marked B. The separator at the bottom of sheet-iron drill-tube is marked 4. The iron rods that extend from the drills to the drill-supporter are marked 1. The drill-supporter is marked M. The lever that raises the drills is marked N. The roller is marked E. The roller-stay is marked F. The main frame of the whole machine is marked G. The seat is marked Z. The platform is marked I. The block to attach the hopper to the frame is marked J. The blocks to attach the drills to the main frame are marked H. The block behind the drill-supporter to keep the drills in their place is marked K. The upright piece that fastens the lever N to main frame is marked O. The tongue-brace is marked P. The tongue is marked T. The block to attach the pivot-wheel to the main frame is marked U. The box for the pivot-wheel is marked V. The pivot-wheel is marked W. The center cross-bar of main frame is marked X.

The description and construction of the machine are as follows:

The rotary digger A is a wooden cylinder, which rolls on the ground in front of the seed-drills, and has iron or steel teeth, which stick in the ground as the cylinder revolves. These teeth are fastened on the cylinder at proper distance, so that when the rotary digger revolves the teeth will stick into the ground and tear it up, and pulverize the ground, and prepare the ground for the seed. The rotary digger is raised by lever R, which is attached to the rotary-digger frame by iron rods 3, so that when you press on handle S, which is attached to lever R, the frame of the rotary digger rises up and presses on lever N. The end of lever N runs into staple Q and under the drill-supporter M, so that when lever R raises the rotary digger it also raises the seed-drills.

The rotary digger, seed-drills, and roller are all combined by the main frame G. The rotary digger is behind the pivot-wheel, the seed-drills behind the rotary digger, and the roller behind the seed-drills. The rotary digger prepares the ground, the drills deposit the seed or grain, and the roller smooths the ground.

I use the pivot-wheel, roller, and drills of some of the known kinds in common use.

What I claim as my invention and new, and for which I ask Letters Patent, is—

The combination and arrangement of the rotary digger A, seed-drills D, hopper L, roller E, frame G, and levers N R R, as and for the objects herein set forth.

JOSEPH TEDFORD.

Witnesses:
WILLIAM C. SHEPHERD,
CLARK BUDGLEY.